United States Patent
Chun et al.

(10) Patent No.: US 8,411,617 B2
(45) Date of Patent: Apr. 2, 2013

(54) METHOD FOR TRANSMITTING CHANNEL INFORMATION IN WIRELESS COMMUNICATION SYSTEM

(75) Inventors: Jin Young Chun, Anyang-si (KR); Hyun Soo Ko, Anyang-si (KR); Moon Il Lee, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 649 days.

(21) Appl. No.: 12/385,312

(22) Filed: Apr. 3, 2009

(65) Prior Publication Data

US 2009/0303928 A1 Dec. 10, 2009

Related U.S. Application Data

(60) Provisional application No. 61/042,281, filed on Apr. 4, 2008, provisional application No. 61/049,770, filed on May 2, 2008, provisional application No. 61/045,590, filed on Apr. 16, 2008.

(30) Foreign Application Priority Data

Jun. 18, 2008 (KR) .................. 10-2008-0057480

(51) Int. Cl.
  *H04W 4/00* (2009.01)
  *H04W 68/00* (2009.01)
(52) U.S. Cl. .............. 370/328; 455/422.1; 455/460
(58) Field of Classification Search .......... 370/328
 See application file for complete search history.

(56) References Cited

U.S. PATENT DOCUMENTS

| | | | | |
|---|---|---|---|---|
| 7,526,292 B2* | 4/2009 | Kim et al. | | 455/450 |
| 7,697,622 B2* | 4/2010 | Han et al. | | 375/260 |
| 7,848,295 B2* | 12/2010 | Kang et al. | | 370/332 |
| 7,933,195 B2* | 4/2011 | Kim et al. | | 370/204 |
| 8,305,944 B2* | 11/2012 | Chun et al. | | 370/310 |
| 2005/0025039 A1* | 2/2005 | Hwang et al. | | 370/206 |
| 2005/0195909 A1* | 9/2005 | Hwang et al. | | 375/260 |
| 2005/0201295 A1* | 9/2005 | Kim et al. | | 370/241 |
| 2005/0201309 A1* | 9/2005 | Kang et al. | | 370/310 |
| 2006/0094436 A1* | 5/2006 | Kim et al. | | 455/450 |
| 2006/0146856 A1* | 7/2006 | Jung et al. | | 370/431 |
| 2006/0148411 A1* | 7/2006 | Cho et al. | | 455/67.13 |
| 2006/0268983 A1* | 11/2006 | Kwon et al. | | 375/240.11 |
| 2007/0053456 A1* | 3/2007 | Kim | | 375/260 |
| 2007/0115862 A1* | 5/2007 | Lee et al. | | 370/260 |
| 2007/0207742 A1* | 9/2007 | Kim et al. | | 455/69 |
| 2007/0213070 A1* | 9/2007 | Kim et al. | | 455/452.2 |
| 2008/0187000 A1* | 8/2008 | Kim et al. | | 370/465 |
| 2008/0212531 A1* | 9/2008 | Park et al. | | 370/329 |
| 2008/0305745 A1* | 12/2008 | Zhang et al. | | 455/67.11 |
| 2009/0130986 A1* | 5/2009 | Yun et al. | | 455/67.11 |
| 2009/0252091 A1* | 10/2009 | Tang et al. | | 370/328 |
| 2010/0182961 A1* | 7/2010 | Kim et al. | | 370/329 |
| 2011/0013563 A1* | 1/2011 | Sivanesan et al. | | 370/328 |

OTHER PUBLICATIONS

IEEE Std 802.16-2004 (Revision of IEEE Std 802.16-2001; IEEE Standard for Local and metropolitan area networks, Part 16: Air Interface for Fixed Broadband Wireless Access Systems, 2004.

* cited by examiner

*Primary Examiner* — Guang Li

(74) *Attorney, Agent, or Firm* — McKenna Long & Aldridge LLP

(57) ABSTRACT

A method for transmitting uplink channel information in a wireless communication system is provided. The method comprises transmitting an adaptive modulation and coding (AMC) band bitmap indicating at least one AMC band selected from a plurality of AMC bands with a first transmission period through a plurality of uplink control channels and transmitting a channel quality indicator (CQI) based on transmission of the AMC band bitmap with a second transmission period through any one of the plurality of uplink control channels.

7 Claims, 6 Drawing Sheets

METHOD FOR TRANSMITTING CHANNEL INFORMATION IN WIRELESS COMMUNICATION SYSTEM

CROSS-REFERENCE TO RELATED APPLICATIONS

This application claims the benefit of priority of U.S. Provisional Application No. 61/042,281 filed on Apr. 4, 2008, U.S. Provisional Application No. 61/049,770 filed on May 2, 2008, U.S. Provisional Application No. 61/045,590 filed on Apr. 16, 2008, and Korean Patent Application No. 10-2008-0057480 filed on Jun. 18, 2008, which are incorporated by reference in their entirety herein.

BACKGROUND

1. Technical Field

The present invention relates to a wireless communication system, and more particularly, to a method for transmitting channel information in a wireless communication system.

2. Related Art

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

A mobile station (MS) transmits, to a base station (BS), channel information required by the BS to schedule downlink radio resources. The channel information may be an adaptive modulation and coding (AMC) band bitmap, a channel quality indicator (CQI), rank information (RI), a precoding matrix indicator (PMI), etc. The BS schedules the radio resources by using the channel information received from the MS.

FIG. 1 is a flow diagram showing an example of a method for transmitting channel information according to the conventional IEEE 802.16 standard.

Referring to FIG. 1, an MS transmits a permutation type change request to a BS (step S100). For example, an MS may request permutation type to be changed from a normal permutation type to an AMC type. Examples of the normal permutation type include full usage of subchannels (FUSC) and partial usage of subchannels (PUSC) using an open loop mode, and AMC type using a closed loop mode. Upon receiving the permutation type change request, the BS transmits a report-request message for channel measurement to the MS (step S110). In response to the report-request message, the MS transmits a report-response message to the BS (step S120). The report-response message includes an AMC band bitmap. Further, the MS periodically transmits channel information (e.g. CQI, PMI, etc.) to the BS (step S130). The BS schedules downlink radio resources by using the received CQI, PMI, etc. (step S140).

In this case, the MS transmits information for the AMC band bitmap to the BS only when the report-request message is received from the BS. Since the information for the AMC band bitmap is non-periodically transmitted, there is a problem in that, when the information for the AMC band bitmap is changed in the middle of transmission, the changes in the information cannot be flexibility handled. In addition, the report-response message is unreliable as a medium access control (MAC) message, which may result in an error in a process of transmitting the message. Therefore, there is a need for a new method for reliably transmitting important information such as the AMC band bitmap.

SUMMARY

The present invention provides a method for periodically transmitting an adaptive modulation and coding (AMC) band bitmap.

According to an aspect of the present invention, a method for transmitting uplink channel information in a wireless communication system comprises transmitting an adaptive modulation and coding (AMC) band bitmap indicating at least one AMC band selected from a plurality of AMC bands with a first transmission period through a plurality of uplink control channels; and transmitting a channel quality indicator (CQI) based on transmission of the AMC band bitmap with a second transmission period through any one of the plurality of uplink control channels.

According to another aspect of the present invention, a method for transmitting uplink channel information in a wireless communication system comprises transmitting an adaptive modulation and coding (AMC) band bitmap indicating at least one AMC band selected from a plurality of AMC bands with a first transmission period through a plurality of uplink control channels and transmitting a channel quality indicator (CQI) based on transmission of the AMC band bitmap with a second transmission period through any one of the plurality of uplink control channels and transmitting a preceding matrix indicator (PMI) based on transmission of the AMC band bitmap through another one of the plurality of uplink control channels.

DESCRIPTION OF EXEMPLARY EMBODIMENTS

Figure 1:
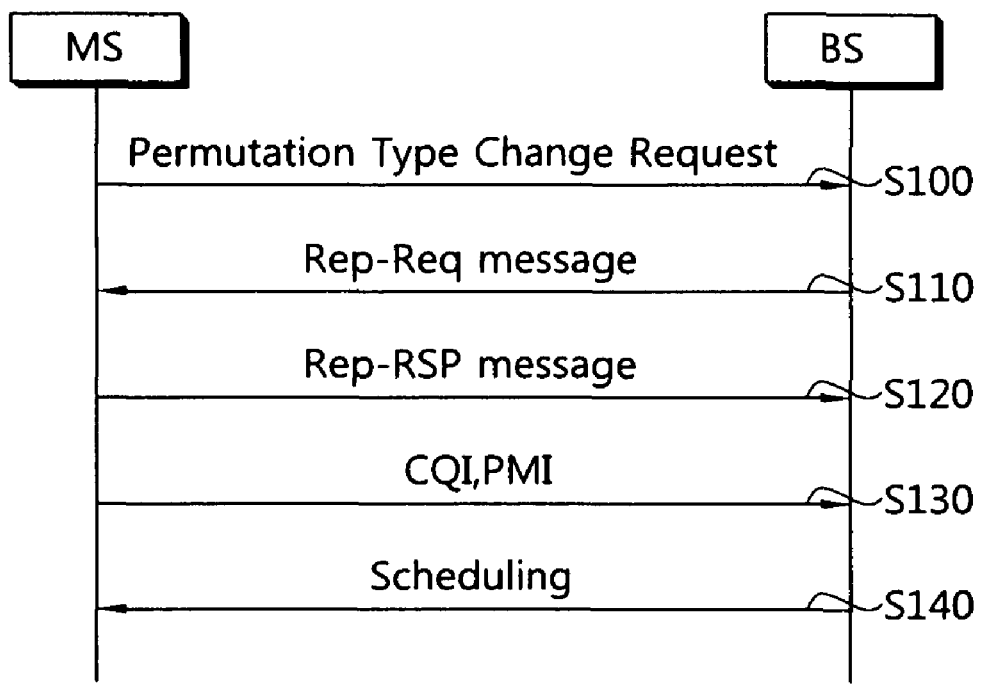
FIG. 1 is a flow diagram showing an example of a method for transmitting channel information according to a conventional institute of electrical and electronics engineers (IEEE) 802.16 standard.
Figure 2:
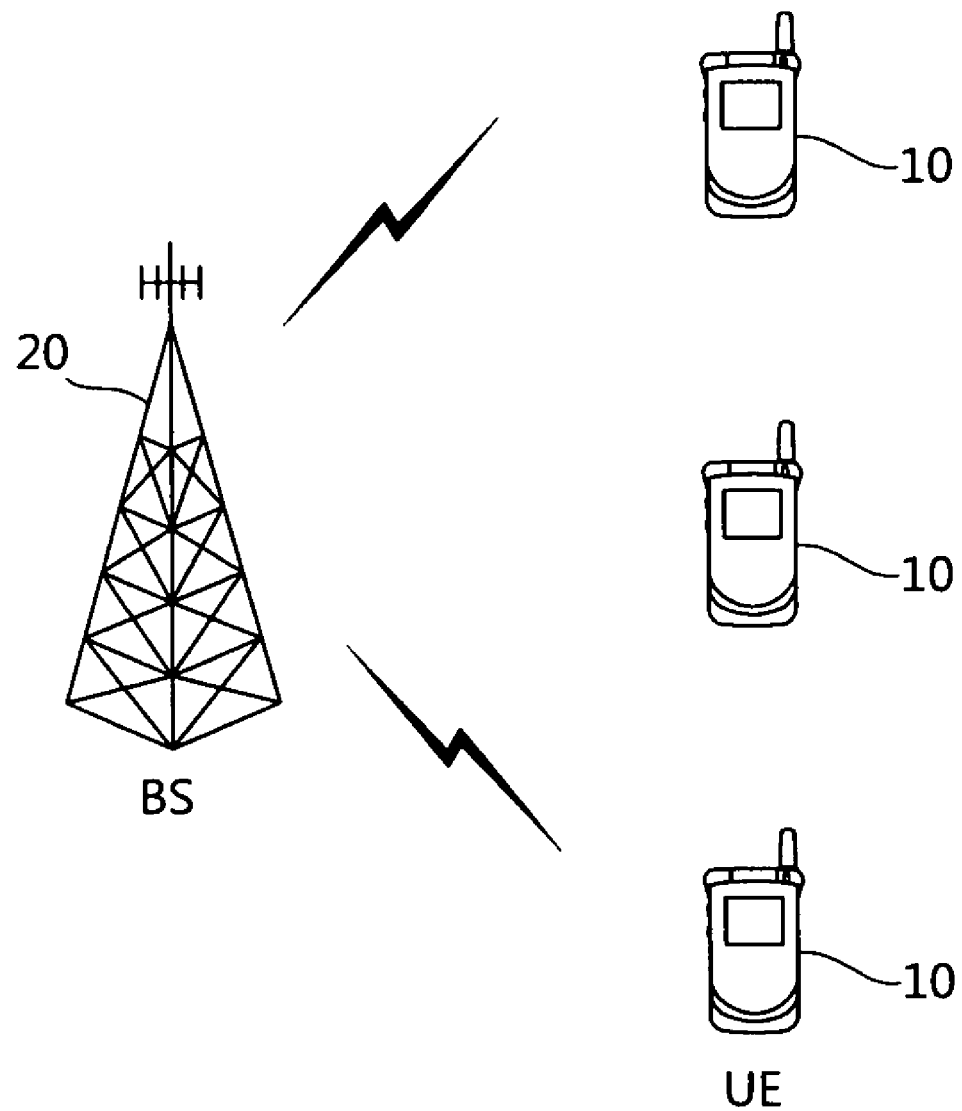
FIG. 2 shows a wireless communication system.

FIG. 2 shows a wireless communication system. The wireless communication system can be widely deployed to provide a variety of communication services, such as voices, packet data, etc.

Referring to FIG. 2, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

Figure 3:
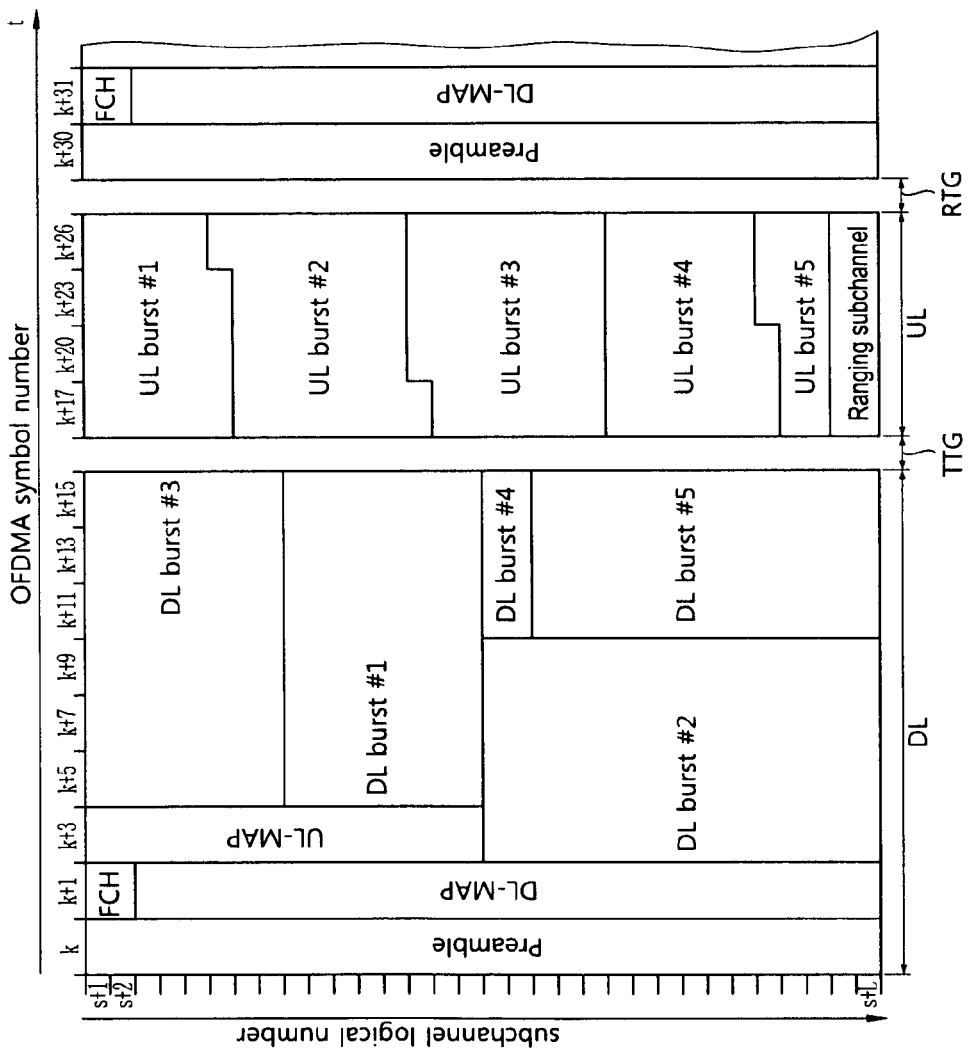
FIG. 3 shows an example of a frame structure.

FIG. 3 shows an example of a frame structure. A frame is a data sequence used according to a physical specification in a fixed time duration. This may be found in section 8.4.4.2 of the "Part 16: Air Interface for Fixed Broadband Wireless Access Systems" in the institute of electrical and electronics engineers (IEEE) 802.16-2004.

Referring to FIG. 3, the frame includes a DL frame and a UL frame. The DL frame temporally precedes the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and a UE for initial synchronization, cell search, and frequency-offset and channel estimation. The FCH includes information indicating a length of a DL-MAP message and a coding scheme of the DL-MAP.

The DL-MAP is a region for transmitting the DL-MAP message. The DL-MAP message defines access to a DL channel. This implies that the DL-MAP message defines indication and/or control information for the DL channel.

The DL-MAP message includes a configuration change count of a downlink channel descriptor (DCD) and a BS identifier (ID). The DCD describes a downlink burst profile applied to a current MAP. The downlink burst profile indicates characteristics of a DL physical channel. The DCD is periodically transmitted by the BS by using a DCD message.

The UL-MAP is a region for transmitting a UL-MAP message. The UL-MAP message defines access to a UL channel. This implies that the UL-MAP message defines indication and/or control information for the UL channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel. The UCD is periodically transmitted by the BS by using a UCD message.

A fast-feedback region is included in a portion of the UL frame. The fast-feedback region is a region which is allocated for faster uplink transmission than general uplink data transmission. A channel quality indicator (CQI), an acknowledgement (ACK)/non-acknowledgement (NACK) signal, etc., can be carried on the fast-feedback region. The fast-feedback region may be located in any position in the UL frame, and the position or size of the fast-feedback region is not limited as shown in FIG. 3.

In order for data to be mapped to physical subcarriers in a physical layer, two steps are generally performed on the data. In a first step, the data is mapped to at least one data slot on at least one logical subchannel. In a second step, each logical subchannel is mapped to a physical subcarrier. Full usage of subchannels (FUSC), partial usage of subchannels (PUSC), optional-FUSC (O-FUSC), optional-PUSC (O-PUSC), adaptive modulation and coding (AMC), etc., are examples of a permutation rule introduced in the IEEE 802.16-2004 standard. A set of OFDM symbols using the same permutation rule is referred to as a permutation zone. One frame includes at least one permutation zone.

The FUSC and the O-FUSC are used only in downlink transmission. In the FUSC, a subchannel includes 48 subcarriers. Each subchannel is mapped to a physical subcarrier distributed throughout the entire physical channel. This mapping varies for each OFDM symbol. The O-FUSC uses a pilot allocation scheme different from that used in the FUSC.

The PUSC is used both in downlink transmission and uplink transmission. In the PUSC, a subchannel includes 24 or 16 subcarriers. In the DL, each physical channel is divided into clusters, each of which includes 14 contiguous subcarriers on two OFDM symbols. The physical channel is mapped to 6 groups. In each group, pilots are allocated in fixed positions to each cluster. In the UL, subcarriers are divided into tiles, each of which includes four contiguous physical subcarriers on three OFDM symbols. The subchannel includes 6 tiles. Pilots are allocated to the corners of each tile. Meanwhile, the O-PUSC is used only in uplink transmission, and each tile includes three contiguous physical subcarriers on three OFDM symbols. In the O-PUSC, pilots are allocated to the center of each tile.

Adaptive modulation and coding (AMC) is used for both downlink transmission and uplink transmission. A bin is a basic allocation unit in the DL and UL, and includes 9 contiguous subcarriers on one OFDM symbol. An AMC subchannel consists of 6 contiguous bits. A slot conforming to a format of the AMC subchannel may have a format of 6 bins×1 OFDM symbol, 3 bins×2 OFDM symbols, 2 bins×3 OFDM symbols, or 1 bin×6 OFDM symbols. In an AMC permutation rule, one physical band includes a 4-row bin, and one logical band denotes a group of physical bands. Therefore, if an FFT size is 2048 or 1024, the maximum number of logical bands is 12.

When the UE transmits channel information in the UL, the transmitted channel information may be in regard to M logical bands having a good channel state. In this case, an AMC band bitmap can be used to indicate the selected N logical bands. For example, a selected logical band can be expressed by '1', and an unselected logical band can be expressed by '0'. If 3rd, 5th, and 6th logical bands are selected from 12 logical bands, the AMC band bitmap can be expressed by '0b0010 1100 0000'.

Figure 4:
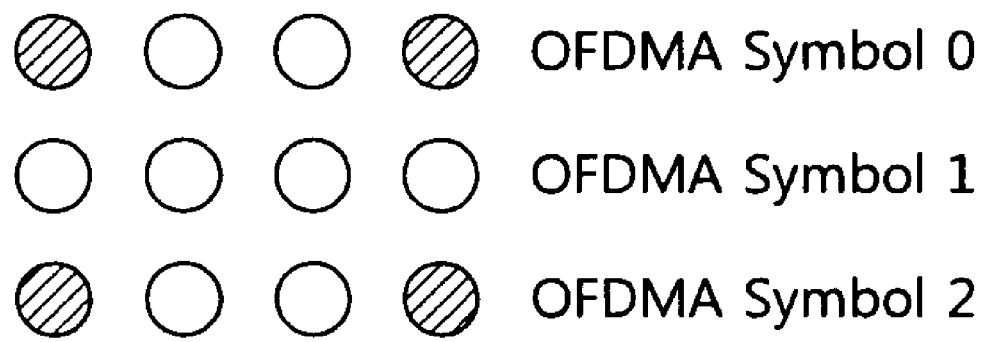
FIG. 4 shows an example of a tile.

FIG. 4 shows an example of a tile. The tile is a PUSC tile.

Referring to FIG. 4, one tile consists of 4 subcarriers in a frequency domain and 3 OFDM symbols in a time domain, that is, 12 subcarriers in total. The 12 subcarriers can be divided into 8 data subcarriers M0 to M7 and 4 pilot subcarriers. A data symbol is carried on the data subcarrier. The data symbol may be a symbol for user data or a control signal. A pilot or 'Null' can be carried on the pilot subcarrier. To utilize the pilot subcarrier, other data symbols may be carried and transmitted on the pilot subcarrier. In the UL, a subchannel conforming to the PUSC permutation rule includes 48 data subcarriers and 24 pilot subcarriers.

Hereinafter, a channel quality indicator channel (CQICH) denotes an uplink control channel for transmitting a control signal such as a channel quality indicator (CQI) by using a 6-bit payload.

The CQI may have various formats such as a signal to noise ratio (SNR), a signal to interference and noise ratio (SINR), a carrier to interference and noise ratio (CINR), a modulation and coding scheme (MCS) level, a data rate indicator, a received signal strength indicator, etc.

A precoding matrix indicator (PMI) is also referred to as precoding matrix information or a codebook index.

The CQICH for transmitting the control signal may be mapped to one subchannel consisting of 6 tiles. As shown in FIG. 4, when the PUSC permutation is used, one tile consists of 8 data subcarriers and 4 pilot subcarriers. Channel information is mapped to the 8 data subcarriers of each tile. Table 1 below shows modulation symbols carried on the 8 data subcarriers of each tile. One modulation symbol is carried on one data subcarrier, and 8 modulation symbols carried on one tile constitute one vector. 8 types of vectors can be formed in total, and their indices have values in the range of 0 to 7.

TABLE 1

| Vector Index | $M_{n,\,8m}, M_{n,\,8m+1}, \ldots, M_{n,\,8m+7}$ |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Symbols constituting each vector can be expressed by Equation 1 below.

$$P_0 = \exp\left(j\frac{\pi}{4}\right)$$
$$P_1 = \exp\left(j\frac{3\pi}{4}\right)$$
$$P_2 = \exp\left(-j\frac{3\pi}{4}\right)$$
$$P_3 = \exp\left(-j\frac{\pi}{4}\right)$$

[Equation 1]

Herein, vectors having different indices are orthogonal to one another.

Table 2 below shows an example of a vector allocated to a CQICH when a 6-bit payload is used.

TABLE 2

| 6-bit Payload (binary) | Fast-feedback Vector indices per Tile Tile(0), Tile(1), ..., Tile(5) |
| --- | --- |
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 000101 | 5, 5, 5, 5, 5, 5 |
| 000110 | 6, 6, 6, 6, 6, 6 |
| 000111 | 7, 7, 7, 7, 7, 7 |
| 001000 | 2, 4, 3, 6, 7, 5 |

TABLE 2-continued

| 6-bit Payload (binary) | Fast-feedback Vector indices per Tile Tile(0), Tile(1), ..., Tile(5) |
| --- | --- |
| 001001 | 3, 5, 2, 7, 6, 4 |
| 001010 | 0, 6, 1, 4, 5, 7 |
| 001011 | 1, 7, 0, 5, 4, 6 |
| 001100 | 6, 0, 7, 2, 3, 1 |
| 001101 | 7, 1, 6, 3, 2, 0 |
| 001110 | 4, 2, 5, 0, 1, 3 |
| 001111 | 5, 3, 4, 1, 0, 2 |
| 010000 | 4, 3, 6, 7, 5, 1 |
| 010001 | 5, 2, 7, 6, 4, 0 |
| 010010 | 6, 1, 4, 5, 7, 3 |
| 010011 | 7, 0, 5, 4, 6, 2 |
| 010100 | 0, 7, 2, 3, 1, 5 |
| 010101 | 1, 6, 3, 2, 0, 4 |
| 010110 | 2, 5, 0, 1, 3, 7 |
| 010111 | 3, 4, 1, 0, 2, 6 |
| 011000 | 3, 6, 7, 5, 1, 2 |
| 011001 | 2, 7, 6, 4, 0, 3 |
| 011010 | 1, 4, 5, 7, 3, 0 |
| 011011 | 0, 5, 4, 6, 2, 1 |
| 011100 | 7, 2, 3, 1, 5, 6 |
| 011101 | 6, 3, 2, 0, 4, 7 |
| 011110 | 5, 0, 1, 3, 7, 4 |
| 011111 | 4, 1, 0, 2, 6, 5 |
| 100000 | 6, 7, 5, 1, 2, 4 |
| 100001 | 7, 6, 4, 0, 0, 0 |
| 100010 | 4, 5, 7, 3, 0, 6 |
| 100011 | 5, 4, 6, 2, 1, 7 |
| 100100 | 2, 3, 1, 5, 6, 0 |
| 100101 | 3, 2, 0, 4, 7, 1 |
| 100110 | 0, 1, 3, 7, 4, 2 |
| 100111 | 1, 0, 2, 6, 5, 3 |
| 101000 | 7, 5, 1, 2, 4, 3 |
| 101001 | 6, 4, 0, 3, 5, 2 |
| 101010 | 5, 7, 3, 0, 6, 1 |
| 101011 | 4, 6, 2, 1, 7, 0 |
| 101100 | 3, 1, 5, 6, 0, 7 |
| 101101 | 2, 0, 4, 7, 1, 6 |
| 101110 | 1, 3, 7, 4, 2, 5 |
| 101111 | 0, 2, 6, 5, 3, 4 |
| 110000 | 5, 1, 2, 4, 3, 6 |
| 110001 | 4, 0, 3, 5, 2, 7 |
| 110010 | 7, 3, 0, 6, 1, 4 |
| 110011 | 6, 2, 1, 7, 0, 5 |
| 110100 | 1, 5, 6, 0, 7, 2 |
| 110101 | 0, 4, 7, 1, 6, 3 |
| 110110 | 3, 7, 4, 2, 5, 0 |
| 110111 | 2, 6, 5, 3, 4, 1 |
| 111000 | 1, 2, 4, 3, 6, 7 |
| 111001 | 0, 3, 5, 2, 7, 6 |
| 111010 | 3, 0, 6, 1, 4, 5 |
| 111011 | 2, 1, 7, 0, 5, 4 |
| 111100 | 5, 6, 0, 7, 2, 3 |
| 111101 | 4, 7, 1, 6, 3, 2 |
| 111110 | 7, 4, 2, 5, 0, 1 |
| 111111 | 6, 5, 3, 4, 1, 0 |

One subchannel is allocated for the CQICH, and thus 6 tiles are allocated to one CQICH. Since one vector is allocated to one tile, 6 vectors are required to express channel information.

Mapping of the channel information on the CQICH may be found in sector 8.4.5.4.10 of the IEEE standard 802.16-2004 "Part 16: Air Interface for Fixed Broadband Wireless Access Systems".

According to the conventional technique, the AMC band bitmap is transmitted on a medium access control (MAC) message such as a report-response message. In this case, a transmission process using the MAC message is susceptible to errors, which leads to a problem of low transmission reliability. Since the AMC band bitmap is important information, reliable transmission can be achieved through the CQICH. However, since the CQICH has a 6-bit payload as described above, transmission using the CQICH is problematic when a size of the AMC band bitmap is greater than 6 bits.

Figure 5:
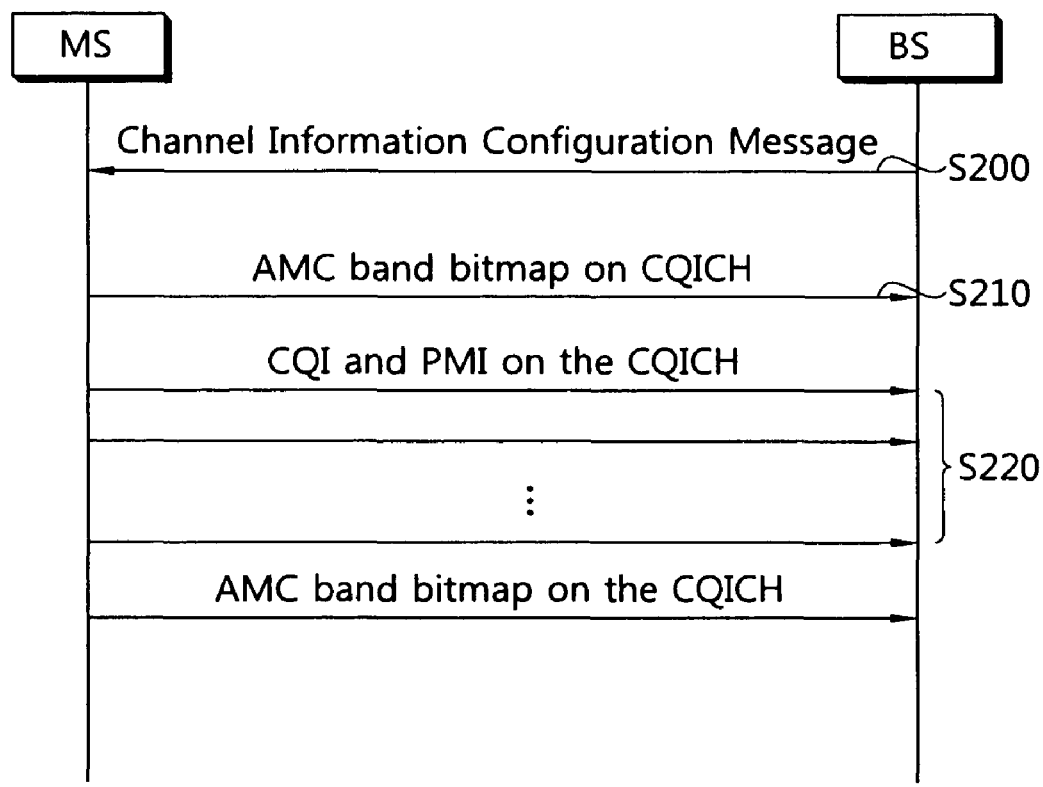
FIG. 5 is a flow diagram showing a method for transmitting channel information according to an embodiment of the present invention.

FIG. 5 is a flow diagram showing a method for transmitting channel information according to an embodiment of the present invention.

Referring to FIG. 5, a BS transmits a channel information configuration message to an MS (step S200). The channel information configuration message may be a CQICH allocation message or a CQICH enhanced allocation message. The channel information configuration message may include information for a CQI channel identification (CQICH ID), a transmission period, a transmission duration, a feedback type, etc. The CQICH ID is an index for identifying a CQICH allocated to the MS. The transmission period is information indicating a period of frames at which the channel information is transmitted. The transmission duration is information indicating the number of frames during which the channel information is transmitted. The feedback type indicates a specific rule by which the channel information is transmitted, that is, indicates a type of the channel information transmitted on the CQICH.

The MS periodically transmits the CQI and the PMI to the BS on the CQICH on which the AMC band bitmap has been transmitted (step S220). For example, the CQI may be transmitted on the 1st CQICH, and the PMI may be transmitted on the 2nd CQICH. If a payload for one CQICH has a size of 6 bits, a CQI (5 bits) and RI (1 bit) may be simultaneously transmitted on the 1st CQICH.

In step S210 and step S220, the AMC band bitmap and the CQI/PMI are periodically transmitted on the same CQICH. In this case, if a transmission time of the AMC band bitmap is identical to a transmission time of the CQI/PMI, there is a need to determine which information will be first transmitted. For example, assume that the transmission period of the AMC band bitmap is 8 frames, and the transmission period of the CQI/PMI is 1 frame. Then, in a frame corresponding to a multiple of 8, the AMC band bitmap may be transmitted with a higher priority than the CQI/PMI. That is, in the frame corresponding to a multiple of 8, the AMC band bitmap may be transmitted instead of transmitting the CQI/PMI.

Table 3 below shows an example of information included in the channel information configuration message.

TABLE 3

| Syntax | Size(bit) | Notes |
| --- | --- | --- |
| Feedback Type | 2 | 0b10: two CQICHs allocation for CL-MIMO Number of streams(MSB) + CINR in first CQICH Codebook index in second CQICH |
| Report type | 1 | For CL-MIMO, 0: Report for midamble 1: Report for dedicated pilots (Or 0: Report average CINR or Codebook index of best bands for midamble 1: Report average CINR or Codebook index of whole band for midamble) |
| AMC Band Bitmap feedback_cycle | 2 | For CL-MIMO, 0b00 = No AMC band indication bitmap feedback. 0b01 = AMC band indication bitmap shall be transmitted on the two CQICHs every k allocated CQICH transmission opportunity. 0b10 = AMC band indication bitmap shall be transmitted on the two CQICHs every 2k allocated CQICH transmission opportunity. 0b11 = AMC band indication bitmap shall be transmitted on the two CQICHs every 4k allocated CQICH transmission opportunity. (k = 1, 2, 3, . . .) |

For example, the channel information configuration message may include content indicating that a 1st CQICH and a 2nd CQICH are allocated so that the AMC band bitmap is transmitted on the 1st CQICH and the 2nd CQICH, the CQI is transmitted on the 1st CQICH, and the PMI is transmitted on the 2nd CQICH.

The channel information configuration message may be provided singularly or in plurality. That is, the BS may transmit one channel information configuration message to the MS or may transmit two or more channel information configuration messages.

The MS periodically transmits the AMC band bitmap to the BS on the CQICH allocated using the channel information configuration message (step S210). In this case, a plurality of CQICHs may be allocated using the channel information configuration message. For example, if the 1st CQICH and the 2nd CQICH are allocated using the channel information configuration message and if the AMC band bitmap has a size of 12 bits, the MS may transmit 6 bits of the AMC band bitmap on the 1st CQICH to the BS and may transmit the remaining 6 bits on the 2nd CQICH. The 1st CQICH may be a kth slot of a CQICH region, and the 2nd CQICH may be a (k+1)th slot of the CQICH region.

In Table 3 above, if the feedback type is '0b10', two CQICHs are allocated for CL-MIMO so that the RI and the CINR are transmitted on the 1st CQICH and the PMI is transmitted on the 2nd CQICH. Herein, the feedback type indicates a type of a control signal transmitted on the CQICH.

For the CL-MIMO, if the report type is '0', a midamble is measured and reported. If the report type is '1', a pilot dedicated for the MS is measured and reported. Herein, the report type is information indicating which part of the CQI is measured.

In addition, for the CL-MIMO, if the AMC band bitmap feedback_cycle is '0b00', no AMC band bitmap is fed back. If the AMC band bitmap feedback_cycle is '0b01', the AMC band bitmap is fed back on the two CQICHs in every k allocated CQICH transmission opportunity. If the AMC band bitmap feedback_cycle is '0b10', the AMC band bitmap is fed back on the two CQICHs in every 2 k allocated CQICH transmission opportunity. If the AMC band bitmap feedback_cycle is '0b11', the AMC band bitmap is fed back on the two CQICHs in every 4 k allocated CQICH transmission opportunity. Herein, the AMC band bitmap feedback_cycle is information indicating a feedback period and indicating whether the AMC band bitmap is fed back.

Table 4 below shows another example of information included in the channel information configuration message.

TABLE 4

| Syntax | Size(bit) | Notes |
| --- | --- | --- |
| Feedback Type | 2 | 0b10: Number of streams(MSB) + CINR for CL-MIMO<br>0b11: Codebook index for CL-MIMO |
| Report type | 1 | For CL-MIMO,<br>0: Report for midamble<br>1: Report for dedicated pilots<br>(Or<br>0: Report average CINR or Codebook index of best bands for midamble<br>1: Report average CINR or Codebook index of whole band for midamble) |
| AMC Band Bitmap feedback_cycle | 2 | For CL-MIMO,<br>0b00 = No AMC band indication bitmap feedback.<br>0b01 = AMC band indication bitmap shall be transmitted on the two CQICHs every k allocated CQICH transmission opportunity.<br>0b10 = AMC band indication bitmap shall be transmitted on the two CQICHs every 2k allocated CQICH transmission opportunity.<br>0b11 = AMC band indication bitmap shall be transmitted on the two CQICHs every 4k allocated CQICH transmission opportunity.<br>(k = 1, 2, 3, . . .) |

In Table 4 above, if the feedback type is '0b10', the RI and the CINR are transmitted. If the feedback type is '0b11', the codebook index is transmitted. Herein, the feedback type indicates a type of a control signal transmitted on the CQICH.

For example, assume that the BS transmits two channel information configuration messages to the MS, and the 1st channel information configuration message is configured such that the transmission period is every 20 frames, the feedback type is 0b10, the MIMO permutation feedback cycle is 0b11 (k=2), whereas the 2nd channel information configuration message is configured such that the transmission period is every 20 frames, the feedback type is 0b11, and the MIMO permutation feedback cycle is 0b11 (k=2). Then, on the CQICH allocated using the 1st channel information configuration message, the MS transmits to the BS the rank information (MSB) and the CINR in every frame, transmits a part of the AMC band bitmap in every 8 frames instead of transmitting the rank information and the CINR. In addition, on the CQICH allocated using the 2nd channel information configuration message, the MS transmits to the BS the codebook index in every frame, and transmits the remaining parts of the AMC band bitmap in every 8 frames instead of transmitting the codebook index.

In Table 4 above, information for the report type and the AMC band bitmap feedback_cycle is the same as the information of Table 3 above.

Table 5 below shows another example of information included in the channel information configuration message.

TABLE 5

| Syntax | Size(bit) | Notes |
| --- | --- | --- |
| Feedback Type | 3 | 0b110: AMC band indication bitmap<br>0b111: Number of Streams + average CQI |
| CQICH Type | 3 | 0b000: 6 bit CQI<br>0b001: Reserved<br>0b010: 3 bit CQI(even)<br>0b011: 3 bit CQI(odd)<br>0b100: 6 bit CQI(primary)<br>0b101: 4 bit CQI(secondary)<br>0b110-0b111: Reserved |

In Table 5 above, if the feedback type is '0b110' and the CQICH type is '0b000', 6 bits of the AMC band bitmap may be transmitted to the BS on the 1st CQICH, and the remaining 6 bits of the AMC band bitmap may be transmitted to the BS on the 2nd CQICH. In addition, if the feedback type is '0b111' and the CQICH type is '0b000', the MS may transmit the 1-bit RI and the 5-bit CQI to the BS on the CQICH. Herein, the feedback type indicates a type of a control signal transmitted on the CQICH. The CQICH type indicates the number of bits transmitted on the CQICH.

For example, assume that the BS transmits two channel information configuration messages to the MS, and the 1st channel information configuration message is configured such that the transmission period is every 23 frames, the 1st CQICH and the 2nd CQICH have a feedback type of 0b110 and a CQICH type of 0b000, whereas the 2nd channel information configuration message is configured such that the transmission period is every 20 frames, the 1st CQICH has a feedback type of 0b100 and a CQICH type of 0b000, and the 2nd CQICH has a feedback type of 0b111 and a CQICH type of 0b000. Then, the MS transmits the AMC band bitmap in every 8 frames in such a manner that a part of the AMC band bitmap is transmitted on the 1st CQICH, the remaining parts of the AMC band bitmap are transmitted on the 2nd CQICH. In addition, the MS transmits the RI, the CQI, and the codebook index in every frame in such a manner that the codebook index is transmitted on the 1st CQICH, and the RI and the CQI are transmitted on the 2nd CQICH.

Figure 6:
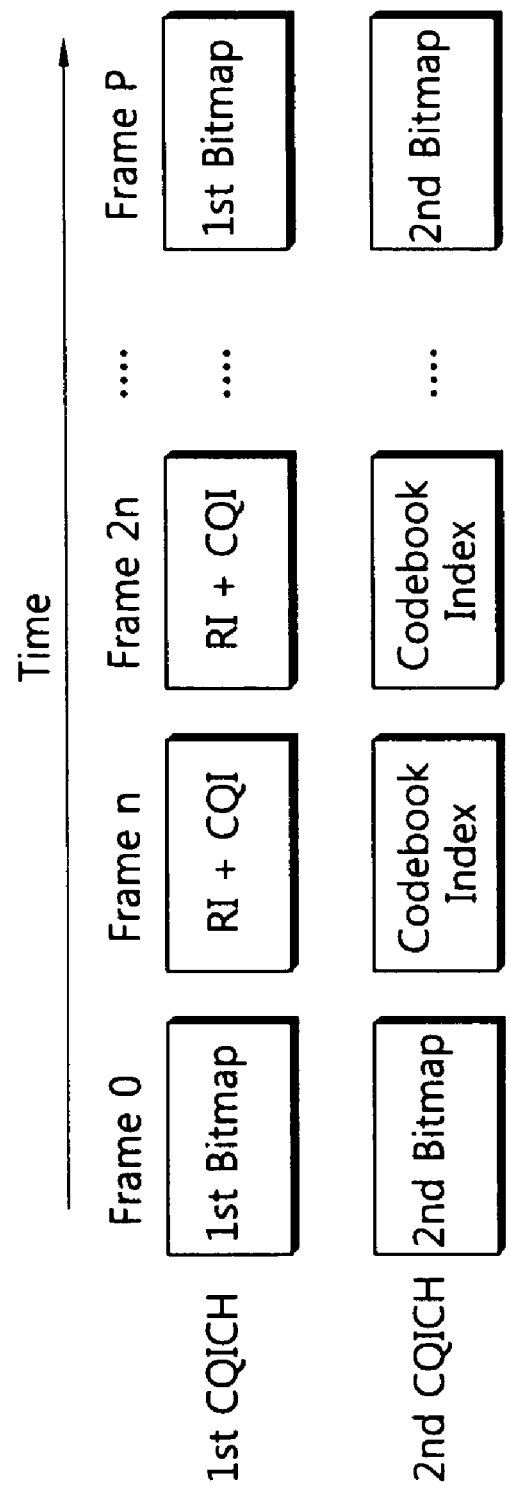
FIG. 6 shows a method for transmitting channel information according to an embodiment of the present invention.

FIG. 6 shows a method for transmitting channel information according to an embodiment of the present invention.

Referring to FIG. 6, an AMC band bitmap is distributively transmitted in every p frames on two CQICHs. For example, if the AMC band bitmap has a size of 12 bits and if 6 bits can be transmitted on one CQICH, first 6 bits of the 12-bit AMC band bitmap are transmitted on the 1st CQICH and the subsequent 6 bits are transmitted on the 2nd CQICH. A CQI and RI are transmitted on the 1st CQICH. A PMI is transmitted on the 2nd CQICH in every n frames. For example, if n=1 and p=8, the AMC band bitmap and the RI/CQI/PMI can be transmitted in an overlapping manner in every frame corresponding to a multiple of 8. In this case, the AMC band bitmap can be transmitted with a higher priority than the RI, the CQI, and the codebook index.

In an environment where the AMC band bitmap changes, the changes in the AMC band bitmap can be flexibly handled by periodically transmitting the AMC band bitmap. Further, an error probability is reduced in a transmission process by performing transmission using not the MAC message but the CQICH, and thus transmission reliability can be more increased.

One CQICH consists of 48 data subcarriers and 24 pilot subcarriers. Equation 2 below shows 6-bit information encoded into 32 bits by using a (6,32)-RM code. Equation 3 below shows source information. Equation 4 below shows an encoded codeword.

$$\begin{bmatrix} v_1 = (\ 0101010101\ \ 0101010101\ \ 0101010101\ \ 01\ ) \\ v_2 = (\ 0011001100\ \ 1100110011\ \ 0011001100\ \ 11\ ) \\ v_3 = (\ 0000111100\ \ 0011110000\ \ 1111000011\ \ 11\ ) \\ v_4 = (\ 0000000011\ \ 1111110000\ \ 0000111111\ \ 11\ ) \\ v_5 = (\ 0000000000\ \ 0000001111\ \ 1111111111\ \ 11\ ) \end{bmatrix} = G_1$$

$$[1 = (\ 1111111111\ \ 1111111111\ \ 1111111111\ \ 11\ )] = G_0$$

$$m = (m_1, m_2, m_3, m_4, m_5, m_0) = [m_1 \mid m_0] \quad \text{[Equation 3]}$$

$$\text{codeword} = [m_1 \mid m_0]\begin{bmatrix} G_1 \\ G_0 \end{bmatrix} \quad \text{[Equation 4]}$$
$$= m_1 v_1 + m_2 v_2 + m_3 v_3 + m_4 v_4 + m_5 v_5 + m_0 1$$

By performing ½ QPSK modulation, a signal for 16 subcarriers can be obtained. If 18-bit information is used, a signal for 48 subcarriers can be mapped to one CQICH. Another code may be used to convert 6 bits into 32 bits. This method is used to transmit three 6-bit CQIs or three 6-bit PMIs for three best bands.

According to the present invention, a mobile station can periodically transmit an adaptive modulation and coding (AMC) band bitmap to a base station and thus can flexibly handle changes in the AMC band bitmap. In addition, the mobile station can reliably transmit the AMC band bitmap.

The present invention may be implemented by hardware, software or a combination thereof. The hardware may be implemented by an application specific integrated circuit (ASIC) that is designed to perform the above-described functions, a digital signal processing (DSP), a programmable logic device (PLD), a field programmable gate array (FPGA), a processor, a controller, a microprocessor, other electronic units, or any combination thereof. The software may be implemented by a module for performing the above functions. The software may be stored in a memory unit and executed by a processor. The memory unit or the processor may employ a variety of means that are well known to those skilled in the art.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A method for transmitting uplink channel information in a wireless communication system, the method comprising:
   receiving a channel information configuration message allocating two channel quality indicator channel (CQICH)s;
   generating an adaptive modulation and coding (AMC) band bitmap indicating at least one AMC band selected from a plurality of AMC bands, the AMC band bitmap having a first payload size;
   transmitting the AMC band bitmap with a first transmission period through the two CQICHs; and
   transmitting a channel quality indicator (CQI) and precoding matrix index (PMI), based on the AMC band bitmap, with a second transmission period which is shorter than the first transmission period, through the two CQICHs,
   wherein when a transmission time of the AMC band bitmap is collided to a transmission time of the CQI, only the AMC band bitmap is transmitted through the two CQICH and
   wherein when the first payload size is larger than the a payload size which can be transmitted through a single CQICH among the two CQICHs,
   the AMC band bitmap is divided into two divided AMC band bitmaps such that each of the divided AMC band bitmaps has a second payload size, the second payload size having equal or less bits size than the payload size of the single CQICH and
   the two divided AMC band bitmaps are transmitted through the two CQICHs.

2. The method of claim 1, wherein the single CQICH comprises a subchannel, the subchannel comprises a plurality of tiles, and one tile comprises a plurality of data subcarriers and a plurality of pilot subcarriers.

3. The method of claim 1,
   wherein the channel information configuration message comprises information indicating whether the AMC band bitmap is transmitted and indicating an AMC band bitmap feedback cycle comprising the first transmission period.

4. The method of claim 1, wherein the channel information configuration message comprising a feedback type indicating transmission of the AMC band bitmap or the CQI.

5. The method of claim 1, wherein the two CQICHs are a first CQICH and a second CQICH, the CQI is transmitted with the second transmission period through the first CQICH, and the PMI is transmitted with the second transmission period through the second CQICH.

6. The method of claim 5, wherein the channel information configuration message comprising a feedback type indicating transmission of the CQI or transmission of the PMI.

7. The method of claim 6, wherein the receiving of the channel information configuration message comprises:
   receiving a first channel configuration message comprising the feedback type for the first CQICH; and
   receiving a second channel information configuration message comprising the feedback type for the second CQICH.

* * * * *